Patented Sept. 14, 1954

2,689,249

UNITED STATES PATENT OFFICE 2,689,249

DIALKYL-2-IMINOIMIDAZOLIDINES AND THEIR SALTS

Peter L. de Benneville and Lawrence J. Exner, Philadelphia, Pa., assignors to Rohm & Haas Company, Philadelphia, Pa., a corporation of Delaware No Drawing. Application July 10, 1952, Serial No. 298,180

9 Claims. (Cl. 260—309.7)

This invention relates to dialkyl ethylene guanidines or 1,3-dialkyl-2-iminoimidazolidines and their salts, in which the alkyl group contains eight to nine carbon atoms. It also concerns a method for the preparation of these compounds. By reaction of beta-bromoethylcyanamide and a lower alkylamine there have been prepared 2-iminoimidazolidines having a lower alkyl group. These compounds have not thus far been found to have any particular utility. They lack fungicidal and bactericidal activity.

In sharp contrast to previously known 2-iminoimidazolidines, the 1,3 - dialkyl - 2 - iminoimidazolidines of this invention are potent fungicides and bactericides against a great variety of organisms.

These compounds have the structure

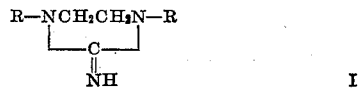

They form salts by addition of acid at the =NH group. They are prepared through reacting an N,N'-dialkylethylenediamine with a cyanogen halide,

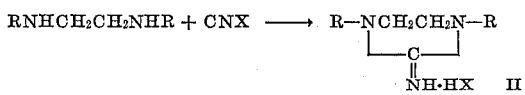

By reaction with an alkaline reagent the above salt is converted to the free base, I, which may be converted to any other salt by direct reaction with an equivalent of any desired acid, inorganic or organic.

Salts may be formed with hydrogen chloride, hydrogen bromide, hydrogen iodide, hydrogen fluoride, fluosilicic acid, sulfuric acid, toluene sulfonic acid, phosphoric acid, formic acid, acetic acid, propionic acid, oxalic acid, succinic acid, chloroacetic acid, phenoxyacetic acid, polychlorophenoxyacetic acids, etc. Furthermore, salts are readily formed from compounds having acidic hydrogens, such as the phenols, typical of which are the chlorophenols including trichloro-, tetrachloro-, and pentachlorophenols, nitrophenol, dinitrophenol, and so on. Acidic compounds forming salts with the 1,3-dialkyl-2-iminoimidazolidines are represented by HY as to one equivalent thereof. The salts formed then have the general formula

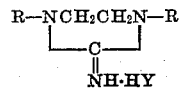

In the preparation of the 1,3-dialkyl-2-iminoimidazolidines of this invention there is used on the one hand cyanogen chloride or cyanogen bromide and on the other hand an N,N'-dialkylethylenediamine of the formula RNHCH₂CH₂NHR 

where R is an alkyl group of eight to nine carbon atoms. These alkyl groups may be branched or straight-chained, including 2-ethylhexyl, isooctyl, n-octyl, n-nonyl, 3,5,5-trimethylhexyl, etc.

The two reactants are conveniently brought together in an inert organic solvent, such as benzene, toluene, xylene, naphtha, and the like. Temperatures between 10° and 60° C. are generally used. There is formed a hydrochloride or hydrobromide, which can be recovered by stripping off solvent. The product can be purified by extraction, solution, precipitation, charcoaling, and similar steps.

The salt thus obtained may be used directly or it may be converted to the basic form which may be used as such. Treatment of the salt with sodium hydroxide, potassium hydroxide, sodium carbonate, sodium methoxide, or similar basic substance effects the desired conversion. The 1,3-dialkyl-2-iminoimidazolidine hydrochloride or hydrobromide is treated most conveniently in an organic solvent. There is formed sodium or potassium chloride or bromide which can be filtered off. The product may be purified by extraction with water.

When it is desired to convert the free base to a salt form, the 1,3-dialkyl-2-iminoimidazolidine is treated with the selected acid in equivalent amount. The reaction may be effected directly or in the presence of a volatile inert solvent such as methanol, ethanol, isopropanol, acetone, petroleum ether, etc.

Typical preparations are described in the following illustrative examples. Parts are by weight.

EXAMPLE 1

To a stirred solution of 312 parts of sym-3,5,5-trimethylhexylethylenediamine in 880 parts of benzene there was added over a period of one hour 61.5 parts of cyanogen chloride with the temperature of the reaction mixture held at 20°–30° C. by cooling. The mixture was then stirred for two hours at room temperature. It was stripped at 100° C./38 mm. to yield a tan solid. This solid was extracted with ethyl acetate to yield 251.4 parts of a white solid product which melted at 225°–228° C. and which corresponded in composition to

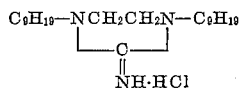

The product contained by analysis 11.21% of nitrogen (theory is 11.24%).

EXAMPLE 2

A solution was made from 37.4 parts of the above product, 1,3-dinonyl-2-iminoimidazolidine hydrochloride, in 237 parts of isopropanol. A small amount of insoluble material was removed by filtering the solution. The clear solution was treated with a solution of 6.6 parts of 85% potassium hydroxide in 79 parts of isopropanol. Potassium chloride formed and was separated by filtering. The filtrate was evaporated and heated to 100° C./25 mm. There resulted a yellow oil. This was taken up in petroleum ether and this solution was washed several times with water. The petroleum ether was distilled off and the resulting oil was stripped at 100° C./30 mm. to yield 26.5 parts of a light brownish oil. By nitrogen analysis this was sym-3,5,5-trimethylhexyl ethylene guanidine in a purity of 93.5%.

EXAMPLE 3

To 34.4 parts of sym-3,5,5-trimethylhexyl ethylene guanidine there were added 80 parts of methanol and 14 parts of salicylic acid. The mixture was heated on a steam bath, and the methanol was evaporated. To the residue was added 170 parts of petroleum ether. There formed a lower layer of insoluble oil which was removed and stripped at 100° C./30 mm. to yield 40 parts of a tan syrup. This was the salicylate of sym-3,5,5-trimethylhexyl ethylene guanidine.

EXAMPLE 4

There were added 16.7 parts of 2,4-dinitrophenol and 32.5 parts of sym-3,5,5-trimethylhexyl ethylene guanidine to 40 parts of methanol. The mixture was stirred and filtered. The filtrate was stripped at 50° C./50 mm. to yield 19 parts of a viscous red oil. This is sym-3,5,5-trimethylhexyl ethylene guanidinium 2,4-dinitrophenate.

EXAMPLE 5

To 21.7 parts of 30% fluosilicic acid was added 32.5 parts of sym-3,5,5-trimethylhexyl ethylene guanidine. After a short time crystals began to form. These were dried at about 100° C. They were sym-3,5,5,-trimethylhexyl ethylene guanidinium fluosilicate.

EXAMPLE 6

There were mixed 15 parts of sym-3,5,5-trimethylhexyl ethylene guanidine and 2.7 parts of glacial acetic acid. A viscous oil formed. It was washed several times with petroleum ether. The oil was then stripped at 100° C./30 mm. to yield 16.8 parts of sym-3,5,5-trimethylhexyl ethylene guanidinium acetate.

EXAMPLE 7

A solution was made of 25.3 parts of sym-3,5,5-trimethylhexyl ethylene guanidine and 19.9 parts of pentachlorophenol in 40 parts of methanol. The solution was filtered free of a slight amount of insoluble material. It was heated on a steam bath under 30 mm. pressure to give a white solid. This was washed with 80 parts of petroleum ether and dried to yield 32.8 parts of a white solid which melted at 164°–171° C. and which corresponded in composition to sym-3,5,5-trimethylhexyl ethylene guanidinium pentachlorophenate.

EXAMPLE 8

A solution was made of 100 parts of N,N'-didodecylethylenediamine in 220 parts of benzene. Thereto was added over a period of a half-hour 15.4 parts of cyanogen chloride with the temperature of the mixture at about 30° C. The mixture was stirred for an hour at room temperature and heated to 47° C. Solvent was taken off under reduced pressure and the residue stripped at 100° C./30 mm. A solid resulted. This was thoroughly extracted with ethyl acetate to yield 50 parts of a white solid. It melted at 125°–145° C. and contained by analysis 8.9% of nitrogen (calculated nitrogen is 9.17%) and had a neutral equivalent of 441 (calculated, 458). The product is sym-dodecyl ethylene guanidinium chloride.

EXAMPLE 9

To 58 parts of sym-2-ethylhexylethylenediamine in 88 parts of benzene there was added over a 25-minute period 12.3 parts of cyanogen chloride while the mixture was cooled with an ice bath. The mixture was then stirred for an hour at room temperature and was freed of solvent. The resulting solid residue was stripped at 100° C./50 mm. It was recrystallized from 800 parts of water to give 60 parts of a light tan solid which melted at 232°–236° C. It contained 12% of nitrogen (theory, 12.1%) and corresponded in composition to sym-2-ethylhexyl ethylene guanidinium chloride.

This is readily convertible to the free base form by reaction with an equivalent weight of potassium hydroxide solution and separation of the potassium chloride formed. The free base form is reacted with acids to form salts as has been illustrated above.

Evaluation of above compounds and of some of their close relatives showed that with N-alkyl substituents of one to four carbon atoms the compounds were ineffective as bactericides or fungicides. For example, sym-butyl ethylene guanidine (and its salts) has a phenol coefficient against *M. pyogenes* var. *aureus* of less than 1.4, this being the lowest value determined in the series of evaluations. Likewise, against *Salmonella typhosa* the phenol coefficient of this butyl compound is less than 1.2, the lowest value determined in this series of evaluations. The sym-dicyclohexyl ethylene guanidinium salts likewise gave coefficients less than 1.4 and 1.2 respectively. On the other end of the series tests with sym-n-dodecylethylenediamine show that the free base and its salts are not effective bactericides, although they have some value as fungicides.

In contrast to the above compounds, the 1,3-dialkyl-2-iminoimidazolidines are good bactericides and fungicides when they contain eight or nine carbon atoms in the alkyl groups. The di-octyl derivatives (bases and salts) have phenol coefficients of 80 to 100 against *Micrococcus pyogenes* and coefficients of 110–150 against *Salmonella typhosa*. For instance, the phenol coefficients found for sym-2-ethylhexyl ethylene guanidinium chloride are 86 against *Micrococcus pyogenes* and 125 against *Salmonella typhosa*.

Phenol coefficients found for sym-3,5,5-trimethylhexyl ethylene guanidinium chloride were 285 against *M. pyogenes* and 275 against *S. typhosa*. Phenol coefficients for sym-3,5,5-trimethylhexyl ethylene guanidinium acetate were 270 against *M. pyogenes* and 235 against *S. typhosa*.

Fungitoxicity tests were made by the slide germination technique with *Macrosporium sarcinaeforme* and *Sclerotinia fructicola* as test organisms.

Di-2-ethylhexyl-2-iminoimidazolidine and its salts were effective in preventing germination of spores of both organisms at 0.001%. At 0.0005% the chloride, as a typical salt, inhibited germination of 81% of the spores of the first organism and 94% of the spores of the second.

Di-3,5,5-trimethylhexyl-2-iminoimidazolidine and its chloride, salicylate, and silicofluoride salts were 100% effective against spores of both organisms at 0.0005%. The 2-4-dinitrophenate of this compound inhibited germination of 98% of the spores of *Macrosporium sarcinaeforme* and of 100% of the spores of *Sclerotinia fructicola* at 0.001%. The pentachlorophenate was similarly effective against *Sclerotinia fructicola*.

Di-methyl-2-iminoimidazolidine chloride is completely ineffective even at 0.1% against spores of both of the above organisms. The dicyclohexyl chloride is effective at 0.1% against *Sclerotinia fructicola* but completely ineffective at 0.01%.

The free sym-alkyl ethylene guanidines are tenaciously held by surfaces and resist removal under a water spray. This is also true of the salicylates, fluosilicates, nitrophenates, and pentachlorophenates. Marked tenacity coupled with other desirable properties make the pentachlorophenates of particular interest.

Typical compounds of this invention were evaluated by determination of the greatest effective dilutions at which the compounds were bactericidally effective against a wide variety of both Gram-positive and Gram-negative bacteria. The evaluation was based on a method of successive dilution in which a trypticasesoy broth was utilized. One percent solutions of the test compounds were diluted with the broth. The resulting dilutions were autoclaved for ten minutes at 10 to 12 pounds' pressure. The dilutions were then cooled and inoculated with a four millimeter loopful of a culture of a test organism. The inoculated dilutions were incubated at 37° C. for 24 hours. The highest dilution showing no growth gave the value for bacteriostatic action. The dilutions were then incubated for a second 24-hour period. Subcultures were made by transferring three loopfuls from cultures showing no growth to fresh broth. The resulting subcultures were incubated for 48 hours at 37° C. The highest dilution showing no growth was the end point for bactericidal action.

Typical data are shown in the following tables.

Table I
EFFECTIVE DILUTIONS FOR 1,3-DI(2-ETHYLHEXYL)-2-IMINOIMIDAZOLIDINIUM CHLORIDE

| Organism | Gram-type | Effective Dilutions | |
|---|---|---|---|
| | | Bacteriostatic | Bactericidal |
| M. pyogenes | + | 1:256,000 | 1:128,000 |
| S. pyogenes | + | 1:1,000,000 | 1:1,000,000 |
| S. fecalis | + | 1:64,000 | 1:64,000 |
| N. catarrhalis | − | 1:512,000 | 1:512,000 |
| S. typhosa | − | 1:8,000 | 1:8,000 |
| P. aeruginosa | − | 1:2,000 | 1:1,000 |
| P. vulgaris | − | 1:1,000 | 1:1,000 |
| B. suis | − | 1:256,000 | 1:256,000 |
| C. welchii | − | 1:128,000 | 1:128,000 |

Table II
EFFECTIVE DILUTIONS FOR 1,3-DI(3,5,5-TRIMETHYLHEXYL)-2-IMINOIMIDAZOLIDINIUM CHLORIDE

| Organism | Gram-type | Effective Dilutions | |
|---|---|---|---|
| | | Bacteriostatic | Bactericidal |
| M. pyogenes | + | 1:512,000 | 1:256,000 |
| S. pyogenes | + | 1:1,000,000 | 1:1,000,000 |
| S. fecalis | + | 1:256,000 | 1:16,000 |
| N. catarrhalis | − | 1:1,000,000 | 1:512,000 |
| S. typhosa | − | 1:16,000 | 1:8,000 |
| P. aeruginosa | − | 1:4,000 | 1:4,000 |
| B. suis | − | 1:512,00 | 1:512,000 |
| C. welchii | − | 1:128,000 | 1:128,000 |

Table III
EFFECTIVE DILUTIONS FOR 1,3-DI(3,5,5-TRIMETHYLHEXYL)-2-IMINOIMIDAZOLIDINIUM ACETATE

| Organism | Gram-type | Effective Dilutions | |
|---|---|---|---|
| | | Bacteriostatic | Bactericidal |
| M. pyogenes | + | 1:1,000,000 | 1:128,000 |
| S. pyogenes | + | 1:16,000,000 | 1:8,000,000 |
| S. fecalis | + | 1:512,000 | 1:64,000 |
| N. catarrhalis | − | 1:8,000,000 | 1:8,000,000 |
| S. typhosa | − | 1:16,000 | 1:16,000 |
| P. aeruginosa | − | 1:4,000 | 1:1,000 |
| B. suis | − | 1:2,000,000 | 1:2,000,000 |
| C. welchii | − | 1:512,000 | 1:512,000 |

These and other test results indicate that the compounds of this invention are effective at considerable dilutions against a considerable variety of organisms.

We claim:

1. As new chemical compounds, iminoimidazolidines of the formula

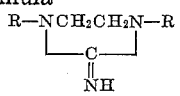

where R is an alkyl group of eight to nine carbon atoms.

2. As new chemical compounds, iminoimidazolidines of the structure

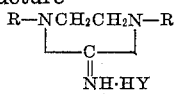

where R is an alkyl group of eight to nine carbon atoms and HY is an equivalent of an acid.

3. As new chemical compounds, 1,3-dinonyl ethylene guanidines having the structure

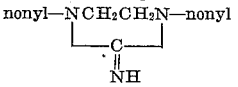

4. As a new chemical compound, 1,3-di(3,3,5-trimethylhexyl)-2-iminoimidazolidine.

5. As a new chemical compound, 1,3-di(3,3,5-trimethylhexyl)-2-iminoimidazolidinium acetate.

6. As a new chemical compound, 1,3-di(3,3,5-trimethylhexyl)-2-iminoimidazolidinium chloride.

7. As a new chemical compound, 1,3-di(3,3,5-trimethylhexyl)-2-iminoimidazolidinium pentachlorophenate.

8. As new chemical compounds, 1,3-dioctyl ethylene guanidines having the structure

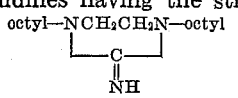

9. As a new chemical compound, 1,3-di(2-ethylhexyl)-2-iminoimidazolidinium chloride.

References Cited in the file of this patent

Chem. Abstract, vol. 44, p. 1954a citing Elderfield, Jr. Org. Chem., vol. 14, pp. 605–637 (1949).